(12) United States Patent
Lehner et al.

(10) Patent No.: US 9,027,911 B2
(45) Date of Patent: May 12, 2015

(54) VALVE TRAY

(75) Inventors: Markus Lehner, Marktrodach (DE); Andreas Wolgast, Hohenstein-Ernstthal (DE); Andreas Gertloff, Stockheim, DE (US)

(73) Assignee: RVT Process Equipment GmbH, Steinwiesen (DE)

( * ) Notice: Subject to any disclaimer, the term of this patent is extended or adjusted under 35 U.S.C. 154(b) by 351 days.

(21) Appl. No.: 13/695,953

(22) PCT Filed: May 3, 2011

(86) PCT No.: PCT/EP2011/002210
§ 371 (c)(1),
(2), (4) Date: Dec. 17, 2012

(87) PCT Pub. No.: WO2011/138018
PCT Pub. Date: Nov. 10, 2011

(65) Prior Publication Data
US 2013/0099402 A1   Apr. 25, 2013

(30) Foreign Application Priority Data
May 4, 2010   (DE) .......................... 10 2010 019 263

(51) Int. Cl.
*B01F 3/04* (2006.01)
*B01D 3/16* (2006.01)
*B01D 3/22* (2006.01)

(52) U.S. Cl.
CPC ............ *B01F 3/04241* (2013.01); *B01D 3/163* (2013.01); *B01D 3/22* (2013.01)

(58) Field of Classification Search
CPC ........ B01D 3/163; B01D 3/22; B01F 3/04241
USPC .................. 261/114.1, 114.3, 114.4
See application file for complete search history.

(56) References Cited

U.S. PATENT DOCUMENTS 3,087,711 A   4/1963   Glitsch
3,146,280 A * 8/1964   Forgrieve ................ 261/114.4
(Continued)

FOREIGN PATENT DOCUMENTS

| CN | 1110868 A | 10/1995 |
| DE | 2352177 A1 | 4/1975 |
| EP | 1880749 A1 | 1/2008 |
| GB | 2321417 A | 7/1998 |

OTHER PUBLICATIONS

International Search Report (PCT/ISA/210) issued on Aug. 9, 2011, by the European Patent Office as the International Searching Authority for International Application No. PCT/EP2011/002210.
(Continued)

*Primary Examiner* — Charles Bushey
(74) *Attorney, Agent, or Firm* — Buchanan Ingersoll & Rooney PC

(57) ABSTRACT

The present invention relates to a valve tray for mass transfer columns having a base plate, at least one liquid intake and at least one liquid outlet for forming a liquid flow having a direction of flow on the base plate, a plurality of gas entry orifices formed in the base plate and also a plurality of fixed valves covering the gas entry orifices, which fixed valves are formed in one piece with the base plate and in each case include a valve roof at a distance to the base plate and also a valve rear side and a valve front side, wherein between the base plate, the valve rear side, the valve front side and the valve roof of each fixed valve, at least one side gas outlet orifice is formed in each case. The side gas outlet orifices of the fixed valves can taper in the direction of flow of the liquid flow.

18 Claims, 2 Drawing Sheets

(56) References Cited

U.S. PATENT DOCUMENTS

Figure 1:
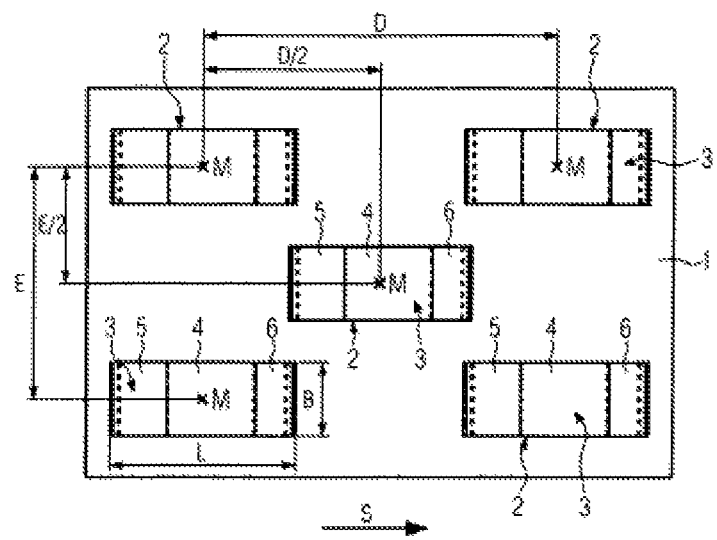

| | | | |
|---|---|---|---|
| 5,360,583 | A | 11/1994 | Nutter |
| 5,788,894 | A | 8/1998 | Yeoman et al. |
| 5,911,922 | A | 6/1999 | Hauser et al. |
| 6,588,736 | B1 | 7/2003 | Chuang et al. |
| 8,540,218 | B2 * | 9/2013 | Binkley et al. ............ 261/114.4 |
| 2008/0018003 | A1 | 1/2008 | Pilling et al. |
| 2012/0118399 | A1 * | 5/2012 | Binkley et al. ............ 137/15.01 |

OTHER PUBLICATIONS

International Preliminary Report on Patentability (PCT/PEA/409) issued on Jul. 4, 2012, by the European Patent Office as the International Examining Authority for International Application No. PCT/EP2011/002210.

German Search Report issued Jan. 4, 2011 for German Application No. 102010019263.5.

English Translation of International Preliminary Report on Patentability, 2012.

Chinese Office Action (First Notification of Office Action) dated Feb. 19, 2014, issued by the State Intellectual Property Office of the People's Republic of China in corresponding Chinese Patent Application No. 2011800260520, and English language translation of Office Action. (7 pages).

* cited by examiner

VALVE TRAY

The present invention relates to a valve tray for mass transfer columns having a base plate, at least one liquid intake and at least one liquid outlet for forming a liquid flow having a direction of flow on the base plate, a plurality of gas entry orifices formed in the base plate and also a plurality of fixed valves covering the gas entry orifices, which fixed valves are formed in one piece with the base plate and in each case comprise a valve roof at a distance to the base plate and also a valve rear side and a valve front side, wherein between the base plate, the valve rear side, the valve front side and the valve roof of each fixed valve, at least one side gas outlet orifice is formed in each case.

Such valve trays are employed in mass transfer columns, for example distillation columns or absorption columns, as gas-liquid contact trays. In the mass transfer columns, two media are contacted, usually a gas and a liquid. In the process, the gas flows through the column from the bottom to the top, the liquid flows through the column from the top to the bottom. The trays are inserted in the column horizontally and serve to contact the gas and the liquid with each other. On each of the trays, at least one liquid intake and at least one liquid outlet are provided. The liquid is fed to the respective tray via the liquid intake and flows over the tray to the liquid outlet. From there, the liquid flows to the tray situated below. In each tray, gas entry orifices are furthermore provided through which the gas rises from the bottom to the top. On the trays, the gas and the liquid come into contact with each other. In a very simple design, the trays can be embodied as sieve trays. In this case, only orifices through which the gas rises to the top are provided in the trays. If the gas flow is too small, there will be a problem of raining down, and the liquid will flow directly downwards through the orifices in the trays.

It is therefore also known to employ valve trays. In this case, the gas entry orifices in the trays are covered by bridge-like valves. The rising gas flows laterally out of the valves through gas outlet orifices. The valves can be embodied to be movable, so that the valves are pushed open to different degrees, depending on the amount of gas flowing through them. In this case, the gas outlet area of the valves can be adjusted.

However, it is also known to embody fixed valves in the base plates. In this case, the valves are firmly connected to the base plate; the gas outlet area cannot be varied. The fixed valves can have most diverse designs and can be usually very easily manufactured, for example by stamping. To this end, the periphery of the gas entry orifices is partially cut out, and the material located in the gas entry orifices is pressed upwards. The material will remain connected to the base plate via the not cutout peripheral regions. By this, side gas outlet orifices are formed between the base plate and the fixed valves which normally extend essentially perpendicularly to the base plate.

A valve tray with fixed valves is described, for example, in U.S. Pat. No. 5,788,894. The valve tray comprises a base plate in which rectangular gas entry orifices are arranged in different orientations, such that the longitudinal axes of the gas entry orifices extend in parallel as well as perpendicularly to the direction of flow of the liquid. The valves arranged above the gas entry orifices each comprise a valve roof and two end plates. The valve roof is arranged at a distance to the base plate and connected to the base plate via the end plates, so that side gas outlet orifices are formed. The valves can have different designs. It is on the one hand known that the valve roof extends in parallel to the base plate, so that two identical, trapezoidal side gas outlet orifices per valve are formed which discharge identical amounts of gas. It is also shown that the valve roof is inclined about the longitudinal axis of the gas entry orifice, so that the side gas outlet orifices have different sizes. Therefore, different amounts of gas flow through the two side gas outlet orifices. In an extreme case, the valve roof is inclined to such an extent that only one side gas outlet orifice is formed, and the other side of the valve roof is directly connected with the base plate. It is furthermore also shown that the valve roof is inclined in the longitudinal direction of the gas entry orifice. Here, too, identical side gas outlet orifices are formed, the height of the gas outlet orifices increasing in the direction of flow. The differently designed valves are arranged on the tray such that a uniform flow of liquid is created over the active area of the tray, and the liquid is guided in the direction towards the outlet.

Another valve tray with fixed valves is shown in DE 23 52 177 A1. On the valve tray, different types of fixed valves are arranged, namely those which form gas injection orifices and those which form forced guidance orifices. Through the gas injection orifices, the gas flows out and is contacted with the liquid, through the forced guidance orifices, gas also flows out and guides the liquid on the valve tray into the desired direction.

However, a disadvantage of this prior art is that still no uniform liquid distribution across the tray is achieved.

It is therefore the object of the present invention to further improve the valve trays with fixed valves known from prior art and in particular achieve uniform liquid distribution across the valve tray.

To this end, it is provided according to the invention that the valve roof is designed to be inclined towards the base plate, so that the side gas outlet orifices of the fixed valves taper in the direction of the liquid flow, i.e. in the direction from the liquid intake to the liquid outlet.

The amount of gas flowing out from the side gas outlet orifices is therefore not constant over the valve length. In the rear region of the side gas outlet orifice, seen in the direction of flow, more gas escapes than in the front region, seen in the direction of flow. The impulse transmission of the flowing-out gas to the liquid thus results in a thrust effect and drives the liquid towards the outlet shaft, i.e. the liquid outlet. The valve geometry thus supports the functioning of the valve tray.

From U.S. Pat. No. 5,911,922, a valve tray with bridge-like valves with a first leg, a second leg and a roof connecting the legs is already known, wherein the legs have different lengths, so that the roof is inclined in the direction of the flow of the liquid. However, these valves are movable valves. In the valve tray, circular orifices are stamped out which are covered by valves that are trapezoidal in the plan view. The legs of the valves are arranged in slots in the valve tray and each have a stop. The stops determine the end positions of the valves. So, the valves are not formed from the material stamped out from the valve tray. If no gas flows through the valve tray, the valves are resting on the tray. In the operation of the valve tray, gas flows from the bottom through the circular orifices in the tray and pushes the valves upwards. In the process, the roofs of the valves initially move upwards in parallel to the tray. Only at a maximum gas flow, when the valves are in their end positions and the stops of the legs rest against the base plate, the roofs of the valves will assume their inclined positions. If the valve tray is operated under a lower gas load, the valve roofs are not inclined.

In a preferred embodiment, it can be provided that the side gas outlet orifices of the fixed valves are embodied in the form of an inequilateral polygon, preferably an inequilateral hexagon. By this valve design, the raining down behavior and the entrainment behavior are improved compared to fixed valves used up to now. The valve's outer sides are rounded and do not have any edges, making them insensitive to soiling.

In another embodiment, it can be provided that the valve front sides and the valve rear sides of the fixed valves are connected with the base plate by means of webs, the webs extending essentially vertically to the top starting from the base plate. By these vertical webs, a deflection and constriction of the gas flow from the gas outlet orifices are reduced. Tests showed that this permits to realize little pressure loss.

It can be furthermore provided that the valve rear side and the valve front side of the fixed valves include an angle of 20° to 40°, preferably 26° each together with a plane spanned by the base plate. This permits a simple embodiment of the fixed valves and the desired rounded shape, so that the valve trays are insensitive to soiling, i. e. fouling.

Still another variant can provide that the difference of the height between the valve roof of the gas outlet orifices at the rear end, seen in the direction of flow, and the height of the valve roof at the front end, seen in the direction of flow, is 1.5 mm to 3 mm, preferably 2.1 mm. Tests showed that in these regions, the desired thrust effect of the gas to the liquid is achieved through the valves.

According to a particularly preferred embodiment, it can be provided that the gas entry orifices in the base plate and the fixed valves have an essentially rectangular design in the plan view. This permits a very simple design of the fixed valves.

Preferably, the length of the gas entry orifices can be within a range of 41 mm to 45 mm, and the clear width of the gas entry orifices can be about 19 mm. This can reduce pressure losses.

Still a further embodiment can provide that the opening ratio of the valve tray, i. e. the sum of the side gas outlet areas of all valves of a valve plate, related on the active tray area, is 6 to 15.5%. The opening ratio corresponds to the sum of the side gas outlet areas of all valves of a valve plate, based on the active tray area. The active tray area is the area of the tray in which gas-liquid contact takes place. The desired opening ratio is achieved by valve spacings within a range of 60×86 mm to 60×145 mm. Valve spacing means the distance between the central points of the gas entry orifices in the base plate. By the above indicated opening ratio, pressure losses can be kept within the desired limits, while at the same time, raining down behavior is satisfactory.

To permit a particularly simple embodiment, it can be provided that the longitudinal axis of the gas entry orifices extends in parallel to the direction of flow.

Figure 2:
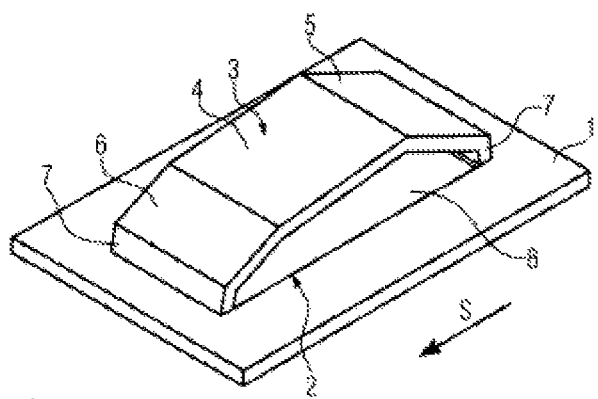
Figure 3:
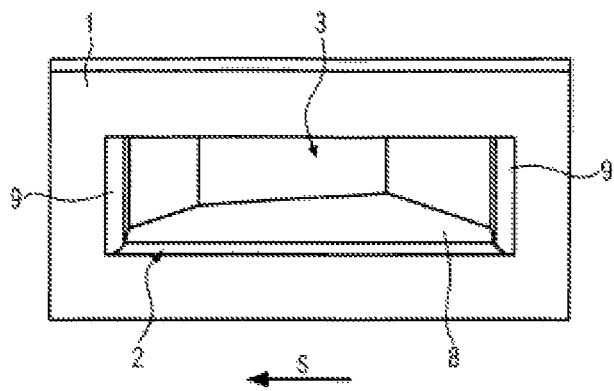
Figure 4:
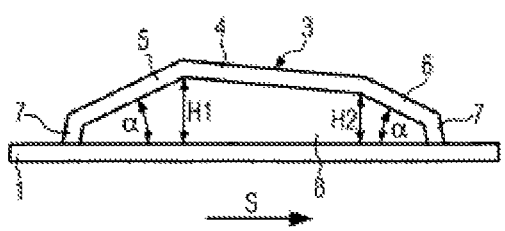
Figure 5:
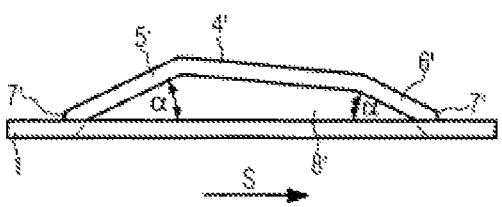

Below, the invention will be described more in detail with reference to drawings. In the drawings:

FIG. 1 shows a plan view of a detail of a valve tray according to the invention, FIG. 2 shows a perspective representation of a fixed valve of the valve tray of FIG. 1 from above, FIG. 3 shows a perspective representation of a fixed valve of the valve tray of FIG. 1 from below, FIG. 4 shows a side view of a first embodiment of the fixed valves, and FIG. 5 shows a side view of a second embodiment of the fixed valves.

FIG. 1 shows a detail of a valve tray according to the invention from above. The valve tray comprises a base plate 1 on which a liquid intake and a liquid outlet are embodied. If the valve tray is disposed in a column, liquid flows from a valve tray situated above it via the liquid intake onto the base plate 1, and on the base plate 1 to the liquid outlet. From the liquid outlet, the liquid falls onto a valve tray situated below it. Therefore, a liquid flow having the direction of flow S (see arrow) is formed on the base plate 1 in operation. In the base plate 1, gas entry orifices 2 are formed which are covered by bridge-like fixed valves 3. The gas entry orifices 2 have rectangular designs and a length L and a width B, the length L being larger than the width B. Preferably, the length L is about 41 mm to 45 mm, the width B about 19 mm. The fixed valves 3 each comprise a valve roof 4, a valve rear side 5 and a valve front side 6. The valve rear side 5 connects the rear end of the valve roof 4, seen in the direction of flow S, with the base plate 1. The valve front side 6 connects the front end of the valve roof 4, seen in the direction of flow S, with the base plate 1.

The gas entry orifices 2, and thus also the fixed valves 3, are arranged on the base plate 1 one behind the other in parallel rows. The longitudinal axes of the gas entry orifices 2 extend in parallel to the direction of flow S. The gas entry orifices 2, and thus also the fixed valves 3 in one row, are arranged at distances to each other, the central points M of the gas entry orifices 2 of one row being at a distance D of about 86 mm to 145 mm. The gas entry orifices 2 of two adjacent rows are each arranged offset with respect to each other. The gas entry orifices 2, and thus also the fixed valves 3 of every second row, are thus lying exactly between the gas entry orifices 2 or the fixed valves 3 of every first row. Thus, the gas entry orifices 2 of every first and every third or every second and every fourth row are lying at the same level in the direction of flow S. The distance E between the central points M of the gas entry orifices 2 of every second row transverse to the direction of flow S is preferably 60 mm. The valve spacing of the valve tray is therefore within a range of 60 mm×86 mm to 60 mm×145 mm.

FIG. 2 shows a perspective view of a fixed valve 3 of the base plate 1 from above. The arrow indicates the direction of flow S of the liquid flow on the base plate 1. The rectangular gas entry orifice 2, which can be seen only partially in FIG. 2, is formed in the base plate 1. The gas entry orifice 2 is covered by the bridge-like fixed valve 3. In a plan view, the fixed valve 3 is also essentially rectangular. The fixed valve 3 comprises a valve roof 4 which is arranged at a distance to the base plate 1. At its rear narrow side, seen in the direction of flow S, the valve roof 4 is connected to the valve rear side 5. A web 7 joins the valve rear side 5 and connects the valve rear side 5 with the base plate 1. The valve front side 6 joins the front narrow side of the valve roof 4, seen in the direction of flow S. The valve front side 6 is also connected with the base plate 1 via a web 7. The fixed valve 3 is thus formed in one piece with the base plate 1.

The webs 7 project essentially perpendicularly from the base plate 1 to the top. The valve rear side 5 and the valve front side 6 are designed to be inclined towards the base plate and include an acute angle together with a plane extending in parallel to the base plate 1. The valve front side 6 is shorter than the valve rear side 5. Thus, the valve roof 4 is also embodied to be inclined towards the base plate 1. The valve roof 4 is thus inclined around the lateral axis of the gas entry orifice 2. The valve roof 4 is not inclined around the longitudinal axis of the gas entry orifice 2.

Since the fixed valve 3 surmounts the gas entry orifice 2 like a bridge, side gas outlet orifices 8 are formed at both longitudinal sides of the fixed valve 3 between the base plate 1 and the fixed valve 3, i. e. the webs 7, the valve front side 6, the valve roof 4 and the valve rear side 5. The gas outlet orifices 8 taper in the direction of flow S. In the example represented in FIG. 2, the gas outlet orifices 8 have the shape of an inequilateral hexagon. The fixed valve 3 has an arched or rounded design, so that the risk of soiling or fouling is reduced.

As described above, the valve roof 4 is connected with the base plate 1 by means of the valve rear side 5 and the web 7 at the rear narrow side, seen in the direction of flow S. Since the valve rear side 5 includes an acute angle with the base plate 1, the side gas outlet orifice 8 is initially enlarged in this region. From the point where the valve rear side 5 passes over into the valve roof 4, the taper of the side gas outlet orifices 8 starts. In the region of the valve front side 6, the taper clearly increases. In the rear region of the side gas outlet orifices 8, seen in the direction of flow S, therefore more gas exits than in the front region of the side gas outlet orifices 8, seen in the direction of flow S, and one can altogether talk of a taper of the side gas outlet orifices 8.

FIG. 3 shows a perspective representation of a fixed valve 3 from the bottom. The gas entry orifice 2 embodied in the base plate 1 can be clearly seen. The gas inlet orifice 2 is covered by the bridge-like fixed valve 3 which is embodied essentially symmetrically to the longitudinal axis of the gas entry orifice 2. In the operation of the columns with the valve trays arranged therein, liquid flows along the upper side of the base plate 1. Gas flows through the column from the bottom to the top, enters the valve tray through the gas entry orifices 2 of the base plate 1 and is laterally deflected by the fixed valve 3, so that it exits through the two side gas outlet orifices 8 at the upper side of the base plate 1 and is contacted with the liquid flowing there. Since the gas outlet orifices 8 taper in the direction of flow S, in the rear region of the gas outlet orifices 8, seen in the direction of flow S, a higher amount of gas exits than in the front region of the gas outlet orifices 8, seen in the direction of flow S. The pulse transmission of the streaming out gas to the liquid thus results in a thrust effect driving the liquid towards the liquid outlet and thus in the direction of flow S. This thrust effect was proven in tests and can be demonstrated, for example, in video sequences. By this thrust effect, the working range of the valve trays can be increased. The valve trays according to the invention can therefore also be operated with high gas loads and low to medium liquid loads without problems.

As can be clearly seen in FIG. 3, the fixed valve 3 is formed in one piece with the base plate 1. The transition 9 from the base plate 1 to the fixed valve 3 is rounded, so that the risk of the formation of soiling in the fixed valves is reduced. Preferably, the fixed valves 3 are produced by stamping out the longitudinal sides L of the gas entry orifice 2 in the base plate and pushing the material located in the gas entry orifices 2 upwards by means of the die. By a suited die shape, the desired valve shape is obtained. The narrow sides B of the gas entry orifices are not cut out, so that the material remains connected with the base plate 1 there.

FIG. 4 shows a side view of the fixed valve 3. As was already described, the fixed valve 3 covers the gas entry orifice 2 in the base plate 1 like a bridge, so that side gas outlet orifices 8 are formed. Since the fixed valve 3 is embodied to be symmetric to the longitudinal axis L of the gas entry orifices 2, two identical side gas outlet orifices 8 are formed. The lower edge of the gas outlet orifice 8 is formed by the base plate 1. The webs 7 join the base plate 1 at the two narrow sides of the gas entry orifice 2, the webs 7 extending nearly vertically to the top. These webs 7 reduce the deflection and constriction of the gas flow, leading to lower pressure losses compared to conventional fixed valves.

Depending on the application or the desired gas flow rate, the gas outlet orifices 8 should have different sizes. This can be achieved by adapting the length of the webs 7 to the respective application. The valve rear side 5 and the valve front side 6, respectively, join the webs 7. The setting angle α of the valve front side 6 and the valve rear side 5 to the horizontal is preferably identical and lies within a range of 20° to 40°. Preferably, the setting angle α is 26°. The valve rear side 5 and the valve front side 6 are connected to each other via the valve roof 4. Since the valve front side 6 is shorter than the valve rear side 5, the valve roof 4 is designed to be inclined with respect to the base plate 1. So, the gas outlet orifice 8 tapers in the direction of flow S.

As described above, the valve roof 4 is connected with the base plate 1 by means of the valve rear side 5 and the web 7 at the rear narrow side, seen in the direction of flow S. Since the valve rear side 5 includes an acute angle with the base plate 1, the side gas outlet orifice 8 is initially enlarged in this region. From the point where the valve rear side 5 passes over into the valve roof 4, the taper of the side gas outlet orifices 8 starts. In the region of the valve front side 6, the taper clearly increases. Therefore, in the rear region of the side gas outlet orifices 8, seen in the direction of flow S, more gas escapes than in the front region of the side gas outlet orifices 8, seen in the direction of flow S, and one can altogether talk of a taper of the side gas outlet orifices 8. The above-described thrust effect on the liquid is achieved.

In the embodiment shown in FIG. 4, the side gas outlet orifice 8 has the shape of an inequilateral hexagon. The difference between the height H1 of the valve roof 4 at the rear end, seen in the direction of flow S, and the height H2 of the valve roof 4 at the front end of the valve roof 4, seen in the direction of flow S, is within a range of 1.5 mm to 3 mm and is preferably 2.1 mm. By this, the side gas outlet orifice 8 obtains the desired shape, so that the gas streaming out through the gas outlet orifices 8 generates the desired thrust effect on the liquid.

FIG. 5 shows a view of a further embodiment of a fixed valve 3'. Below, only the differences to the already described fixed valve 3 will be indicated. In this case, the webs 7' extending from the base plate 1 to the top are clearly shorter. Thus, the area of the side gas outlet orifices 8' is also smaller. The valve rear side 5', the valve front side 6' and the valve roof 4' have a design that is essentially identical to that of the first embodiment. To further reduce the area of the side gas outlet orifices 8', the lower edge of the side gas outlet orifices 8' can moreover be shortened.

Preferably, the webs 7, 7' are not arranged perpendicularly to the base plate but include an angle within a range of 70° to 90°, preferably 80°, with the base plate. Thus, the length of the lower edge of the gas outlet orifices 8, 8' can be varied by varying the length of the webs 7, 7'. Depending on the application, side gas outlet openings are therefore produced with the desired area. This can be simply permitted by setting the stroke of the die during stamping such that the webs 7, 7' obtain the desired length. The area of the side gas outlet orifices is preferably within a range of 152 $mm^2$ to 262 $mm^2$.

With the above mentioned valve spacing, the opening ratio of the valve tray is about 6 to 15.5%. The opening ratio here designates the sum of the side gas outlet orifices of all fixed valves on a valve tray, based on the active tray area. The active tray area is the area of the valve tray in which the contact between gas and liquid takes place.

By the particular geometric design of the fixed valve and the side gas outlet orifices, the raining-down behavior as well as the entrainment behavior are clearly more advantageous compared to fixed valves employed at present.

Since the outer geometry of the fixed valve is round, smooth and free from edges, it is particularly insensitive to soiling.

The invention claimed is:

1. Valve tray for mass transfer columns, comprising:
    a base plate;
    at least one liquid intake and at least one liquid outlet for forming a liquid flow having a direction of flow (S) on the base plate;
    a plurality of gas entry orifices formed in the base plate and a plurality of fixed valves covering the gas entry orifices, which fixed valves are formed in one piece with the base plate and in each case include a valve roof at a distance to the base plate and a valve rear side and a valve front side; and
    at least one side gas outlet orifice formed, in each case, between the base plate, the valve rear side, the valve front side and the valve roof of each fixed valve; wherein the valve roof is inclined towards the base plate so that the side gas outlet orifices of the fixed valves taper in the direction of flow (S) of the liquid flow from the liquid intake to the liquid outlet.

2. Valve tray according to claim 1, wherein the side gas outlet orifices of the fixed valves have a shape of an inequilateral polygon.

3. Valve tray according to claim 1, wherein the valve front sides and the valve rear sides of the fixed valves are connected to the base plate by webs extending essentially vertically to a top, starting from the base plate.

4. Valve tray according to claim 1, wherein the valve rear sides and the valve front sides of the fixed valves include an angle of about 20° to 40°, together with a plane spanned by the base plate.

5. Valve tray according to claim 1, wherein a difference between a height (H1) of the valve roof at a rear end, seen in the direction of flow (S), and a height (H2) of the valve roof at a front end of the gas outlet orifices, seen in the direction of flow (S), is 1.5 mm to 3 mm.

6. Valve tray according to claim 1, wherein the gas entry orifices in the base plate and the fixed valves are formed to be essentially rectangular in the plan view.

7. Valve tray according to claim 6, wherein a length (L) of the gas entry orifices is within a range of 41 mm to 45 mm, and a clear width (B) of the gas entry orifices is about 19 mm.

8. Valve tray according to claim 1, wherein an opening ratio of the valve tray represented as a sum of side gas outlet areas of all valves of a valve plate based on an active base area, is 6% to 15.5%.

9. Valve tray according to claim 1, wherein longitudinal axes of the gas entry orifices extend in parallel to the direction of flow (S).

10. Valve tray according to claim 2, wherein the side gas outlet orifices of the fixed valves have a shape of an inequilateral hexagon.

11. Valve tray according to claim 2, wherein the valve front sides and the valve rear sides of the fixed valves are connected to the base plate by webs extending essentially vertically to a top, starting from the base plate.

12. Valve tray according to claim 1, wherein the valve rear sides and the valve front sides of the fixed valves include an angle of about 26° together with a plane spanned by the base plate.

13. Valve tray according to claim 11, wherein the valve rear sides and the valve front sides of the fixed valves include an angle of about 20° to 40°, together with a plane spanned by the base plate.

14. Valve tray according to claim 1, wherein a difference between a height (H1) of the valve roof at a rear end, seen in the direction of flow (S), and a height (H2) of the valve roof at a front end of the gas outlet orifices, seen in the direction of flow (S), is 2.1 mm.

15. Valve tray according to claim 13, wherein a difference between a height (H1) of the valve roof at a rear end, seen in the direction of flow (S), and a height (H2) of the valve roof at a front end of the gas outlet orifices, seen in the direction of flow (S), is 1.5 mm to 3 mm.

16. Valve tray according to claim 15, wherein the gas entry orifices in the base plate and the fixed valves are formed to be essentially rectangular in the plan view.

17. Valve tray according to claim 16, length (L) of the gas entry orifices is within a range of 41 mm to 45 mm, and a clear width (B) of the gas entry orifices is about 19 mm.

18. Valve tray according to claim 17, wherein an opening ratio of the valve tray represented as a sum of a side gas outlet areas of all valves of a valve plate based on an active base area, is 6% to 15.5%.

* * * * *